(12) United States Patent
Weiler

(10) Patent No.: US 7,357,605 B2
(45) Date of Patent: Apr. 15, 2008

(54) PILOT DRILL WITH COUPON RETAINER AND HOT TAPPING MACHINE USING THE SAME

(76) Inventor: Donald R. Weiler, 17451 Grass Cir., Huntington Beach, CA (US) 92647

(*) Notice: Subject to any disclaimer, the term of this patent is extended or adjusted under 35 U.S.C. 154(b) by 358 days.

(21) Appl. No.: 11/063,295

(22) Filed: Feb. 22, 2005

(65) Prior Publication Data
US 2006/0188349 A1   Aug. 24, 2006

(51) Int. Cl.
B23B 51/04 (2006.01)
B23B 47/34 (2006.01)

(52) U.S. Cl. ............ 408/67; 408/204; 408/207; 408/703

(58) Field of Classification Search ........... 408/67, 408/204, 207, 206, 209, 210, 703
See application file for complete search history.

(56) References Cited

U.S. PATENT DOCUMENTS

| 160,952 A | 3/1875 | Quinn |
| 438,740 A | 10/1890 | Eley |
| 485,715 A * | 11/1892 | Smith ............ 408/67 |
| 1,045,289 A * | 11/1912 | Hill ............ 408/86 |
| 1,603,537 A | 10/1926 | Hathaway |
| 2,601,434 A | 6/1952 | DuBois |
| 2,679,173 A * | 5/1954 | Hill ............ 29/213.1 |
| 2,870,629 A | 1/1959 | Willis |
| 2,941,427 A * | 6/1960 | Ver Nooy ............ 408/83 |
| 2,972,915 A * | 2/1961 | Milanovits et al. ......... 137/318 |
| 3,272,033 A | 9/1966 | Leopold, Jr. et al. |
| 3,773,067 A | 11/1973 | Ray |
| 3,827,448 A | 8/1974 | Alba |
| 3,847,501 A | 11/1974 | Doty |
| 3,870,431 A | 3/1975 | Luckenbill et al. |
| 3,905,718 A * | 9/1975 | Luckenbill et al. ......... 408/111 |
| 3,995,655 A | 12/1976 | Sands |
| 4,077,737 A * | 3/1978 | Morse ............ 408/206 |
| 4,431,017 A | 2/1984 | Willemsen |
| 4,565,471 A * | 1/1986 | Negishi et al. ............ 408/204 |
| 4,902,174 A | 2/1990 | Thompson et al. |
| 5,893,686 A | 4/1999 | Weiler |
| 7,159,603 B2 * | 1/2007 | King et al. ............ 137/15.14 |

FOREIGN PATENT DOCUMENTS

CA          734691          5/1966

(Continued)

Primary Examiner—Monica Carter
Assistant Examiner—Michael W. Talbot
(74) Attorney, Agent, or Firm—Blakely Sokoloff Taylor & Zafman LLP

(57) ABSTRACT

Pilot drill with coupon retainer and hot tapping machine using the same that positively retains a coupon cut out by a hole saw. The pilot drill bit has a shank having a driving end for attachment to a drill driver and a cutting end having a cutting edge thereon, the cutting edge being sized to drill a hole of selected diameter through a workpiece, and a movable retaining finger mounted on the shank adjacent the cutting edge, the movable retaining finger having a first position fitting within the cutting diameter of the cutting edge and a second, extended position where a portion thereof lies outside the cutting diameter to retain on the drill shank a workpiece through which the drill bit may have drilled.

7 Claims, 3 Drawing Sheets

FOREIGN PATENT DOCUMENTS

| | | |
|---|---|---|
| DE | 3808674 A1 | 9/1988 |
| JP | 02311212 A * | 12/1990 |
| JP | 11320226 A * | 11/1999 |
| JP | 2001162422 A * | 6/2001 |
| KR | 610886 B1 * | 8/2006 |

* cited by examiner

PILOT DRILL WITH COUPON RETAINER AND HOT TAPPING MACHINE USING THE SAME

BACKGROUND OF THE INVENTION

1. Field of the Invention

The present invention relates to the field of drills, and more particularly to pilot drills for use with hole saws.

2. Prior Art

In urban areas, there are underground pressurized service mains which supply pressurized fluid for residential and commercial needs. Most often, these fluids are potable water and fuel gas. In some areas, other pressurized fluids are present.

When it becomes necessary to add a new service tap on the line, it is inconvenient to shut down the service line to add a tee. Such a shutdown would cut off service to others on that service main. This problem has been overcome by attaching a saddle to the service line. The saddle has a valve therein, and a piloted hole saw is introduced through the open valve. A well-known structure for accomplishing this is taught in Weiler, U.S. Pat. No. 5,893,686, the entire disclosure of which is incorporated herein by this reference. Such a system is sold by Raydon Industries, LLC, of Huntington beach, Calif. as The SIMTAP Drilling Machine. However, a problem can arise when the pilot drill and hole saw are withdrawn after cutting through the main. In particular, the coupon cut out by the hole saw sometimes falls into the supply main. This is undesirable, and frequently unacceptable, as it should be withdrawn with the pilot drill and hole saw every time.

DETAILED DESCRIPTION OF THE PREFERRED EMBODIMENTS

Figure 1:
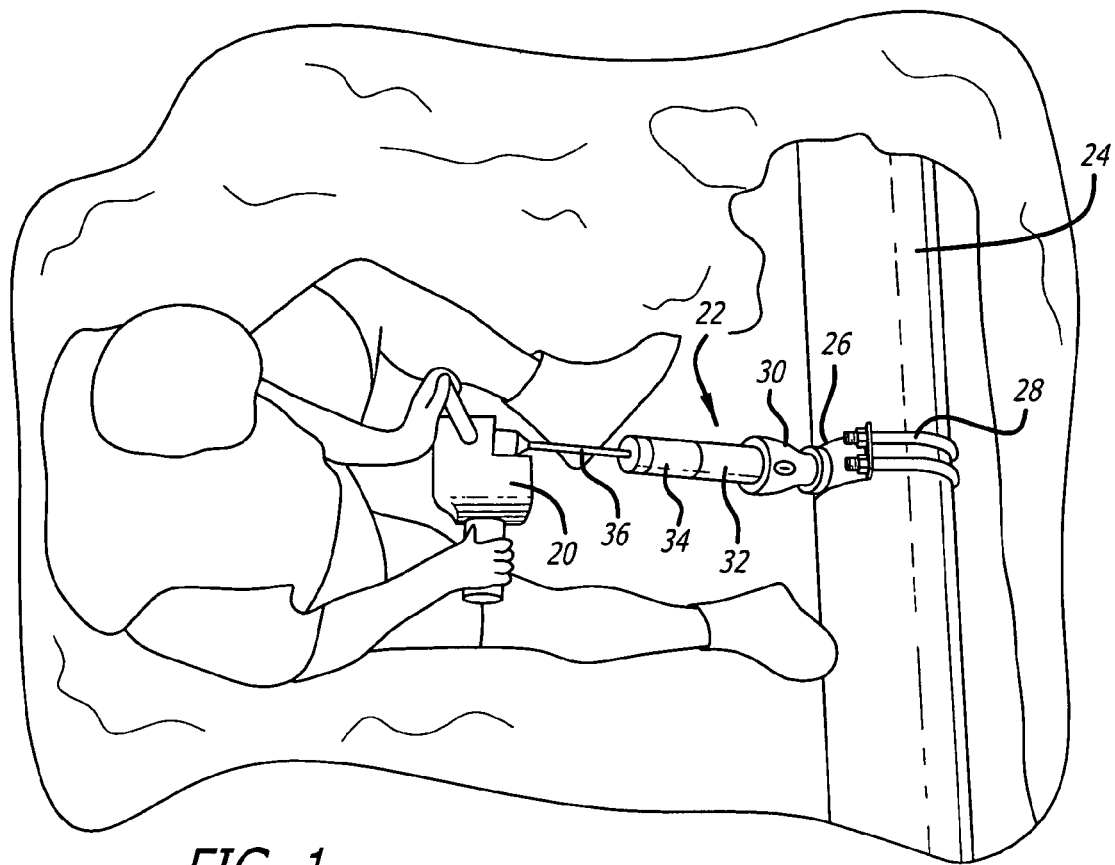
FIG. 1 is an illustration of the use of the present invention with a hot tapping machine for tapping into pressurized mains.

First referring to FIG. 1, a schematic illustration of an individual using a hand drill 20 to power a SIMTAP Drilling Machine, generally indicated by the numeral 22, to provide a new tap into a main 24 may be seen. The SIMTAP operates in conjunction with a saddle 26 clamped around the main 24 using U bolts 28, the saddle being adapted for a ball valve 30 to be screwed there onto. The SIMTAP generally is provided with a plurality of adapters, such as adapter 32, one of which will readily screw onto any of the commonly used ball valves 30, with a body 34 screwing into any of the adapters 32, the body 34 receiving a rotatable shaft 36 and sealing with respect thereto. In that regard, the body 34, adapter 32, ball valve 30 and saddle 26 provide a sealed assembly so that when a hole is made in the main 24, the pressurized fluid in the main will be confined to within the assembly.

In operation, hand drill 20 is used to turn shaft 36 having a hole saw at the inner end thereof passing through the open ball valve 30 to drill a hole in the pressurized main to provide a new tap therein. Once the hole has been drilled, shaft 36 with the hole saw thereon is withdrawn back through the ball valve, and the ball valve closed, after which body 34 and adapter 32 may be removed, with the new service connection being made to the ball valve and the ball valve opened to provide the new service.

Figure 2:
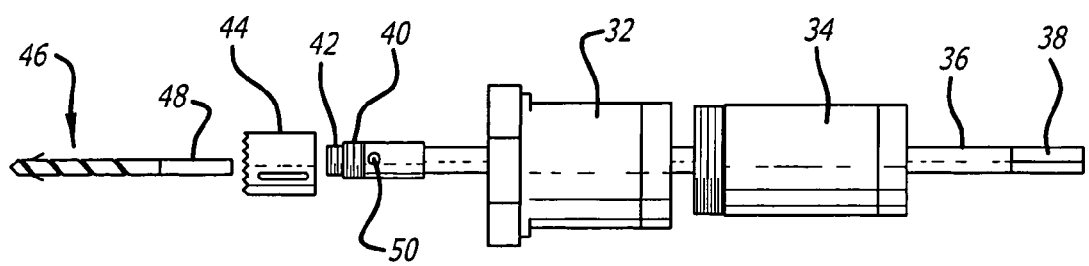
FIG. 2 is an exploded view of a hot tapping machine with a pilot drill in accordance with the present invention.

The basic assembly of the SIMTAP is shown in FIG. 2. Shaft 36 has a hexagonal end 38 for convenient and positive gripping by a drill chuck, and at the opposite end, has threaded areas 40 and 42, one of which will receive one of two sizes of internally threaded connections at the end of commonly used hole saws 44.

Figure 3:
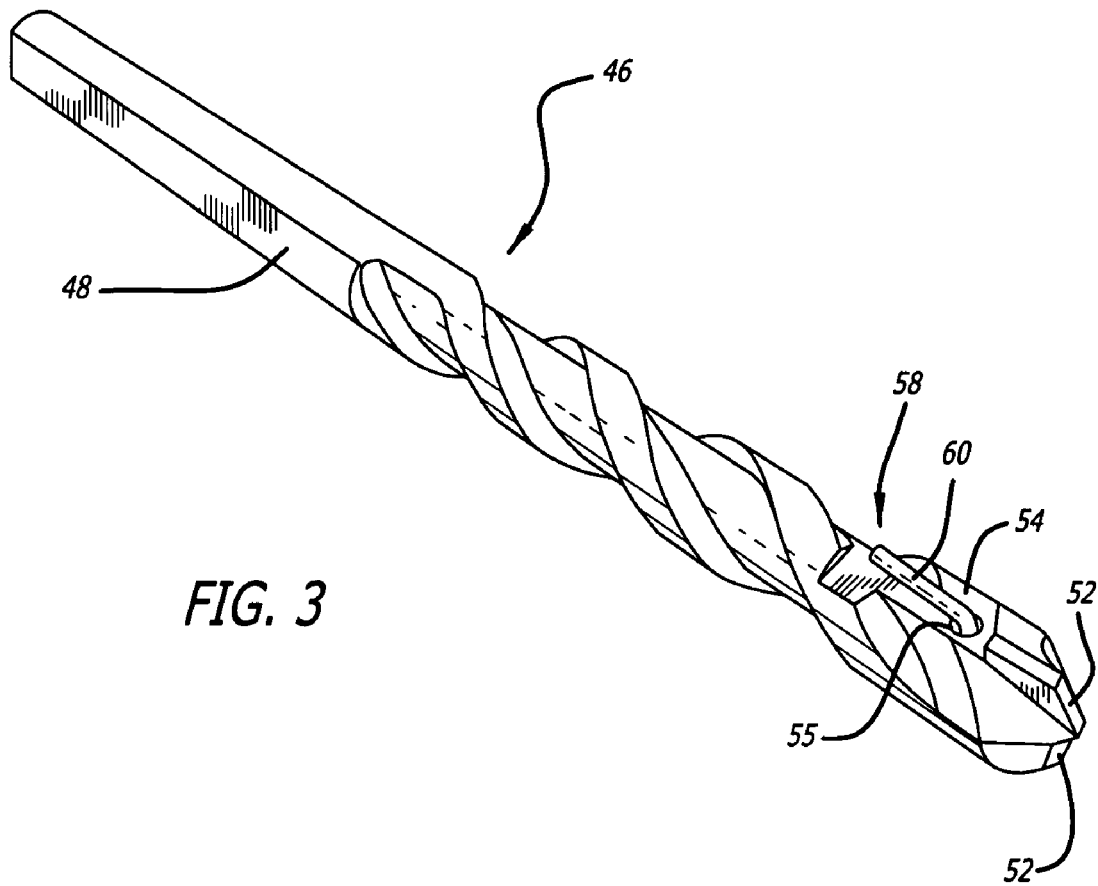
FIGS. 3 and 4 are illustrations of one embodiment of pilot drill in accordance with the present invention.
Figure 4:
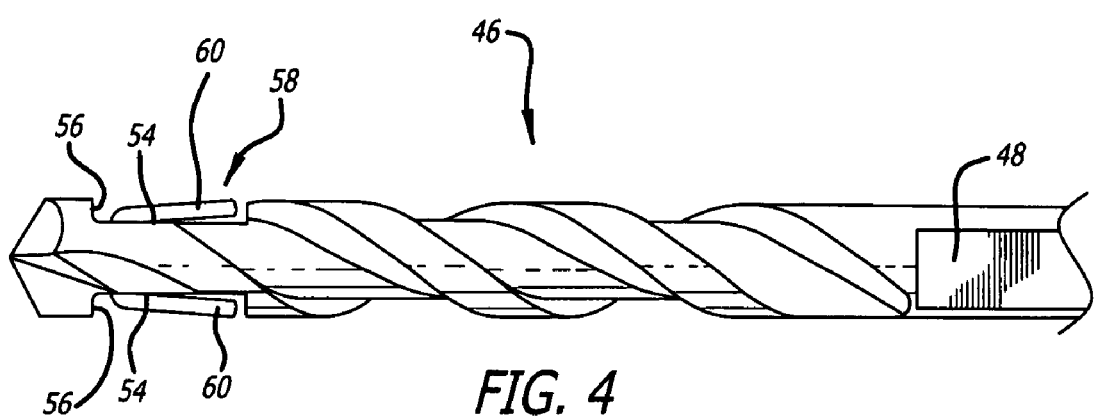

One aspect of the present invention is the pilot drill itself, generally indicated by the numeral 46. In the preferred embodiment, the pilot drill has a flat region 48 at one end thereof which may be inserted into the end of shaft 36 and positively locked therein against relative rotation by set-screw 50. The pilot drill 46 of the preferred embodiment is better illustrated in FIGS. 3 and 4. The specific pilot drill shown in FIGS. 3 and 4 has tungsten carbide cutting blades 52 braised to the end of the drill, with flattened regions 54 in reasonable proximity to the cutting edge end of the drill. A hole 55 is provided through the drill substantially perpendicular to the flattened regions 54 and adjacent ends 56 of those flattened regions. Disposed through the hole 55, and having a loose fit therein, is a wire member generally indicated by the numeral 58 having the ends bent over as shown so that the dimension, tip to tip, across the ends of the side regions 60 of the wire member is approximately equal to the diameter of the drill, that is, the diameter of the hole that the drill will form. In that regard, in the preferred embodiment, the wire 58 is a relatively rigid wire, and accordingly, preferably is bent to have a tip to tip dimension equal to or slightly less than the diameter of the hole the drill will form, though in other embodiments, particularly if the wire is purposely made more flexible, the tip to tip dimension could range from below the size to slightly larger than the hole the drill will form.

Referring again to FIGS. 1 and 2, in use, the saddle 26 is fastened to and sealed with respect to the main 24 using U bolts 28, and the desired ball valve 30 is screwed onto the saddle. The SIMTAP Drilling Machine shown in FIG. 2 is assembled by picking an appropriate adapter 32 which will screw onto the ball valve 30 of FIG. 1, with the body 34 screwing onto the adapter 32. The body 34 includes seals on its inner diameter, which may be o-rings or other appropriate rotating seals, so that shaft 36 may be positioned through and sealed with respect to the body 34 as shown. Hole saw 44 is screwed onto one of threaded regions 40 and 42 on the end of shaft 36, and pilot drill 46 is locked into the end of the shaft 36 by set screw 50 acting against the flat 48 along that end of the pilot drill. With the assembly in place and the ball valve open, the operator, shown in FIG. 1, will feed the shaft 36 through the body 34 and adapter 32 so that the hole saw 44 and pilot drill 46 extend through the open ball valve and, with the drill running, will drill a hole in the main.

Figure 5:
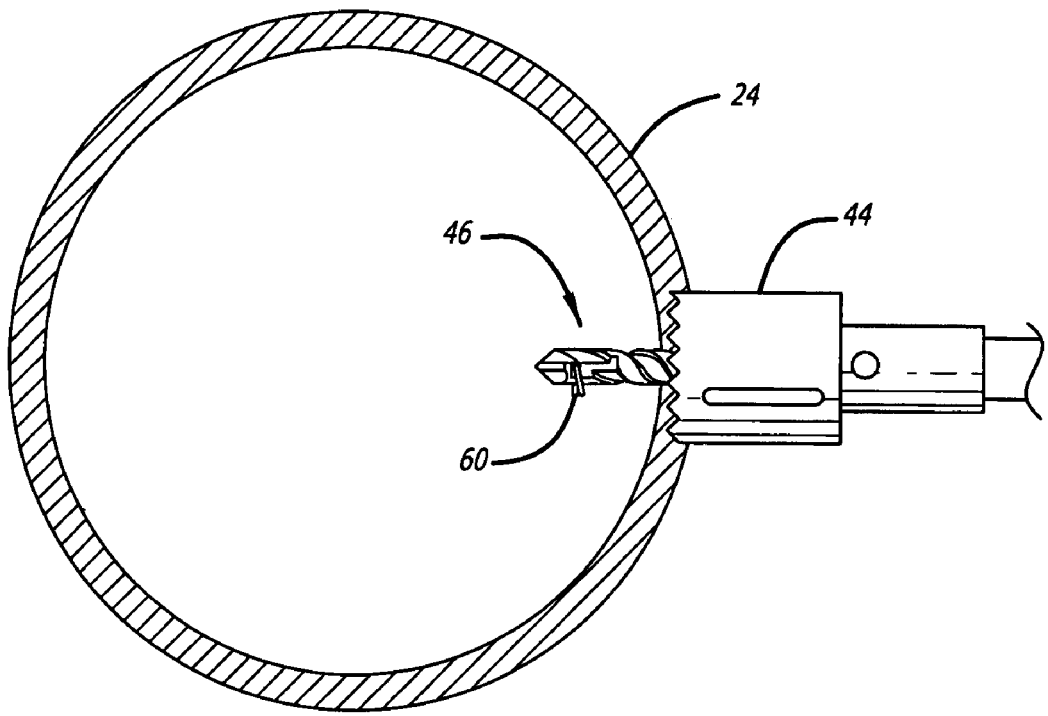
FIGS. 5 and 6 are partial cross sections illustrating the operation of the pilot drill of the present invention.
Figure 6:
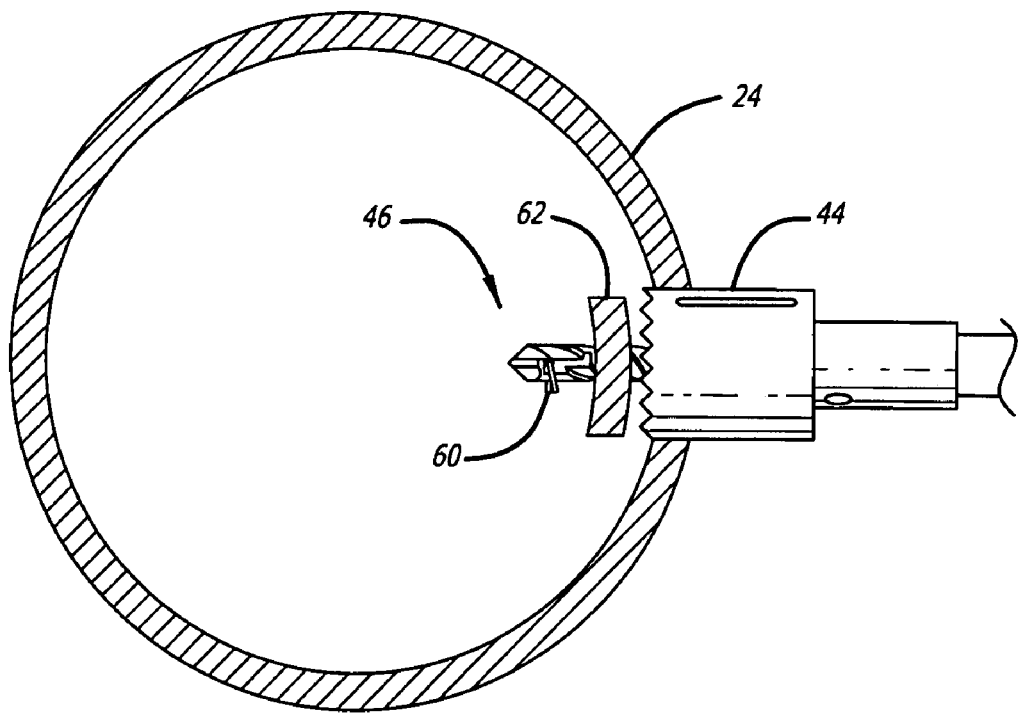

The operation of the pilot drill 46 is illustrated in FIGS. 5 and 6. The pilot drill 46 will penetrate the wall of the main 24 before the hole saw 44 does. This has the advantage of first providing a limited area for fluid communication between the pressurized fluid in the main 24 and the internal volume of the SIMTAP and ball valve assembly, allowing pressures to equalize before the hole saw completes the cutting of the larger hole in the main 24. When the pilot drill 46 penetrates the main 24, centrifugal force on side regions 60 of the wire through the end of the pilot drill 46 causes the wire ends to sling outward as shown in FIGS. 5 and 6, serving as a coupon retaining finger or arms. In this position, coupon 62, once cut free of the main 24, cannot fall into the main, as it cannot slide past the side regions 60 of wire 58, the wire being limited in further rotation by abutment with ends 56 (FIG. 4) of the flats 54 adjacent the end of the drill. In the preferred embodiment, the hardened inserts form the stop. Consequently, coupon 62 is positively retained with respect to the pilot drill 46 and will always be removed from the main 24 and retracted through the ball valve as shaft 36 is withdrawn to its outermost position. In that regard, while the hand drill can be left running during this withdrawal, it has been found that the coupon is always retained, even if the hand drill is shut off during the withdrawal, thereby preventing the coupon from falling into the main 24, or for that matter into the ball valve, which would also cause problems.

The preferred embodiment of the present invention has been disclosed and described with respect to its use with respect to a SIMTAP drilling machine for hot tapping mains, though the pilot drill of the present invention may be readily used with other hot tapping machines, or in other drilling apparatus or other applications where coupon retention is preferred or required, as desired. Similarly, the coupon retention mechanism may take other forms than the simple bent wire of the preferred embodiment. By way of example, in place of the relatively rigid wire member 58 of the preferred embodiment, some form of spring actuated member or members could be used which would elastically fit within the hole formed by the pilot drill 46, though spring outward once through the hole to prevent the coupon 62 from falling off the end of the pilot drill 46. For instance, wire member 58 may readily be sized to provide such a spring action by its own elasticity, the same being dimensioned so as to have a free state distance between tips of side regions 60 intentionally greater than the diameter of the hole drilled by the pilot drill 46. These and other positive coupon retainers, either operative by gravity or centrifugal force, or spring loaded, are within the present invention, though the simple, relatively rigid wire of the preferred embodiment is in fact preferred because of its simplicity, its ruggedness and because it has been found to positively retain the coupon each and every time. Similarly, a conventional drill, such as a tool steel drill without carbide inserts could be used as desired, particularly for drilling into plastic mains. Thus while various embodiments of the present invention have been described herein, it will be understood by those skilled in the art that various changes in form and detail may be made therein without departing from the spirit and scope of the invention.

What is claimed is:

1. A pilot drill bit comprising:
   a shank having a driving end for attachment to a drill driver and a cutting end having a cutting edge thereon, the cutting edge being sized to drill a hole of selected diameter through a work piece;
   the pilot drill bit having a hole approximately perpendicular to an axis of the pilot drill bit adjacent the cutting edge;
   a substantially rigid wire extending through the hole in the pilot drill bit and bent into a U shape having two arms that are spaced apart no more than a diameter of the pilot drill bit, the pilot drill bit being configured to allow the arms of the U shaped wire to point away from the cutting edge when in a first position to freely pass through a hole drilled by the pilot drill bit, and to prevent the arms from rotating so far toward the cutting edge to allow both arms to again fit within the diameter of the pilot drill bit to retain on the pilot drill bit a work piece through which the drill bit may have drilled,
   wherein both arms of the substantially rigid wire extend outward from the diameter of the pilot drill bit when rotated from the first position.

2. The pilot drill bit of claim 1 wherein the cutting end has at least one hard insert secured to the shank of the drill bit, the insert defining the diameter of the hole that will be cut by the pilot drill bit.

3. The pilot drill bit of claim 1 wherein there is a shoulder on the drill shank adjacent the cutting edge, the shoulder acting as a stop to limit the extent of rotation of the legs away from the first position.

4. A drill bit comprising:
   a shank having an engagement end to be engaged for rotating the drill bit and a drilling end;
   the shank having flats on opposite sides of the shank adjacent the drilling end;
   the shank having a hole through the shank substantially perpendicular to an axis of the drill bit adjacent ends of the flats adjacent the drilling end; and,
   a substantially rigid wire extending through the hole and having its ends bent over to fit within the diameter of a hole to be drilled by the drill bit when in a first position, and to rotate out to a second position so that at least one wire end extends outside the diameter of a hole to be drilled by the drill bit and to be stopped at the second position by engagement with the ends of the flats.

5. The drill bit of claim 4 wherein the engagement end of the drill bit has a flat thereon.

6. The drill bit of claim 4 further comprising a shaft, the drill bit being mounted on one end of the shaft and concentric with the shaft, the shaft having mounted thereon a hole saw concentric with the drill bit, the drilling end of the drill bit extending out from the hole saw so that the wire will extend through a hole drilled by the drill bit and rotate to the second position before the hole saw cuts a coupon from a workpiece, the wire preventing the coupon from unintentionally coming off the drill bit.

7. The drill bit of claim 6 wherein the shaft, drill bit and hole saw are coupled to a hot tapping machine, the wire preventing the coupon from unintentionally coming off the drill bit after drilling through a service main.

* * * * *